United States Patent [19]

Howell et al.

[11] Patent Number: 5,070,589
[45] Date of Patent: Dec. 10, 1991

[54] PROCESS FOR SERVICING A JET PUMP HOLD DOWN BEAM IN A NUCLEAR REACTOR

[75] Inventors: David A. Howell, Plum Boro; Jeffrey E. Hydeman, Murrysville; Jeffrey L. Slater, Munhall; Richard J. Bodnar, Monroeville; Leonard R. Golick, Trafford; Robert S. Sekera, Monroeville; Charles H. Roth, Jr., N. Huntingdon, all of Pa.

[73] Assignee: Westinghouse Electric Corp., Pittsburgh, Pa.

[21] Appl. No.: 608,061

[22] Filed: Oct. 31, 1990

Related U.S. Application Data

[62] Division of Ser. No. 308,271, Feb. 8, 1989, Pat. No. 4,995,158.

[51] Int. Cl.⁵ .................. B23P 19/02; B23Q 3/00
[52] U.S. Cl. .................. 29/426.5; 29/464; 29/723; 29/252
[58] Field of Search ............ 29/426.1, 426.5, 428, 29/464, 723, 252, 259, 260, 261, 262

[56] References Cited

U.S. PATENT DOCUMENTS

| | | | |
|---|---|---|---|
| 3,846,898 | 11/1974 | Kerr et al. | 29/259 |
| 4,658,488 | 4/1987 | Johnstead | 29/259 |
| 4,772,446 | 8/1988 | Meuschke | 29/723 X |
| 4,893,395 | 1/1990 | Crowder | 29/259 |

Primary Examiner—Timothy V. Eley

[57] ABSTRACT

Process and apparatus are disclosed for removing and replacing the hold down beams of fluid circulating jet pumps mounted in a nuclear reactor. The disclosed process and apparatus are operable from a position such as the refueling bridge remote from the reactor and while the refueling cavity surrounding the reactor is flooded with moderator fluid.

18 Claims, 9 Drawing Sheets

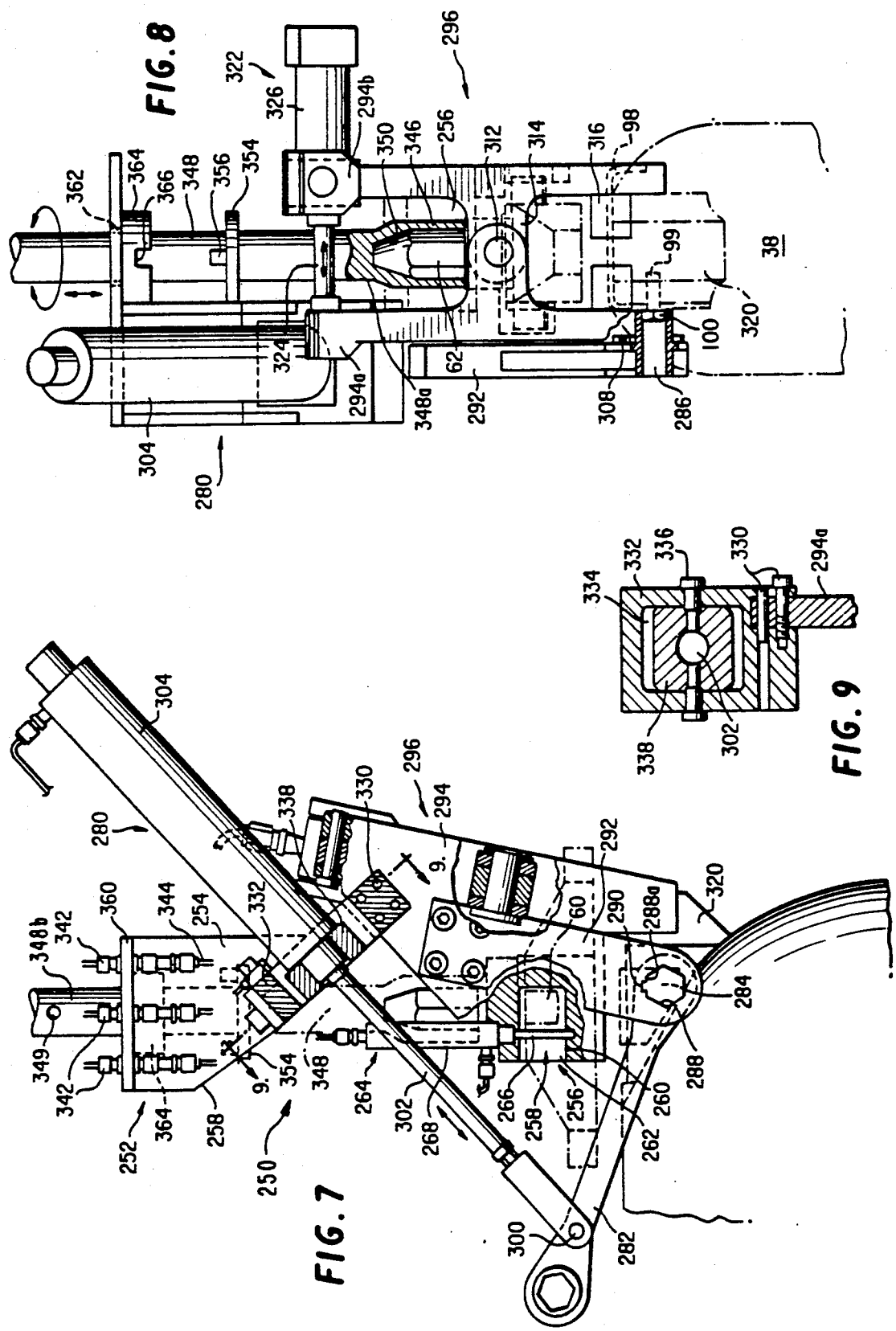

PROCESS FOR SERVICING A JET PUMP HOLD DOWN BEAM IN A NUCLEAR REACTOR

This is a division of application Ser. No. 07/308,271 filed Feb. 8, 1989 now U.S. Pat. No. 4,995,158.

BACKGROUND OF THE INVENTION

1. Field of the Invention

The invention elates generally to a process and apparatus or servicing nuclear reactors. More particularly, the invention relates to the servicing of jet pump hold down beams which are used to secure the position of reactor coolant jet pumps in the reactor.

2. Description of the Related Art

Jet pumps are used in a variety of different types of nuclear reactors for circulating moderator fluid such as cooling water through a reactor core located within the pressure vessel of the reactor structure. Reactors such as boiling water reactors can employ as many as twenty or more downwardly-directed jet pumps mounted in an annulus between the reactor vessel wall and the reactor shroud. Each of the pumps recirculates reactor core moderator coolant fluid such as water by forcing high volumes of the fluid through a venturi nozzle, which then draws surrounding fluid into the pump for circulation. Fluid volumes of on the order of about 94,500 l./min. (25,000 gal./min.) can be obtained from each of the jet pumps. Because of the forces associated with the circulation of such high volumes of fluids, jet pump hold down beam are provided to secure the pump in position throughout pump operation. The hold down beams are pre-tensioned with up to about a 13,600 kg. (30,000 lb.) preload per beam under shoulders formed in a pair of opposed jet pump riser brackets.

Jet pump hold down beams of existing boiling water reactors typically consist of three components: A beam body, a pair of opposed tabs extending outwardly from the beam body, and a threaded beam bolt extending through a correspondingly-threaded channel formed in the beam body. Beam tensioning and detensioning is accomplished by rotation of the beam bolt in the appropriate direction. A beambolt retainer assembly can be provided to stabilize the position of the beam and accompanying beam bolt with respect to the jet pump. The retainer assembly includes a retainer plate having a channel formed therein for receiving the beam bolt and abutting against a flanged end of the beam bolt, and a retainer bolt for coupling the retainer plate to the jet pump. A keeper collar can be provided to rotatably fix the position of the beam bolt within the threaded channel of the beam. The keeper collar is insertable over the upper end of the beam bolt and tack welded to a weld plate coupled to the beam to provide a force resistive to rotational movement of the beam bolt.

Several problems with existing jet pump hold down beams in boiling water reactor plants have been discovered during the course of routine reactor servicing, such as during refueling outages. One problem has been the occurrence of cracking of the tack welds of the beam bolt keepers. Tack weld cracking necessitates re-welding of the keeper to the beam, a difficult procedure to perform under water and in the narrow confines of the reactor annulus. A more serious problem has been the discovery of hold down beam cracks and fissures. Metallurgical studies have revealed the cause of the beam failure to be the result of intergranular stress corrosion cracking, arising from chemical interaction between the beam alloy material and the moderator fluid. These cracked beams must be removed from the jet pump and replaced with new beams. In order to minimize reactor down time, it is desirable to conduct hold down beam replacement during reactor fuel changeovers. However, because the hold down beams are positioned in a relatively narrow annulus between the core shroud and the reactor vessel wall and are submerged in radioactively contaminated moderator fluid at a depth of about 10 meters (30 feet) below the level of the reactor vessel flange, jet pump hold down beam replacement has heretofore been a labor-intensive, time consuming, expensive, and hazardous procedure.

Many of the difficulties associated with jet pump hold down beam replacement arise from the considerable health and safety considerations associated with the design and construction of power generating nuclear reactors. For example, the reactor vessel of a conventional boiling water reactor is submerged in the concrete floor of a floodable refueling cavity and is covered by a vessel head detachably mounted to the vessel flange. In order to obtain access to the jet pump hold down beams of the boiling water reactor, the refueling cavity must first be flooded with moderator fluid such as water so that the vessel bead is immersed in about 15-20 meters of moderator fluid. Only after the refueling cavity has been flooded can the vessel head be safely uncoupled from the vessel flange and various reactor components removed therefrom. Removal of the vessel head and reactor components is accomplished from a refueling platform extending across the top of the refueling cavity. Thereafter, in known servicing techniques, the fluid is drained from the refueling cavity and the cavity walls and floor are scrubbed and decontaminated. A service platform from which hold down beam servicing is to be effected is then assembled across the reactor flange, and designated hold down beams are then removed and replaced. A bolt keeper is tack welded to the top of the beam, and proper moderator fluid chemistry and clarity is restored. The service platform is then removed, and the vessel head is re-installed on the vessel flange. Due to the difficulties presented by this known servicing procedure, the time required to replace the hold down beam of a single jet pump has in the past been on the order of about three days. As there are twenty or more jet pumps spaced about the periphery of the reactor annulus, and because prudence dictates the replacement of all of the hold down beams where abnormalities are found with one or more of the beams, it is readily apparent that jet pump hold down beam servicing is a significant service procedure, resulting in a substantial amount of reactor down time.

Various tools have been used in the past for effecting hold down beam replacement. For example, U.S. Pat. No. 4,406,047 discloses an apparatus and procedure for replacing the jet pump hold down beam in which the beam is forced out from the retainer channel following beam rotation and beam bolt loosening by a separate apparatus. A principal drawback to this arrangement is that the beam retainer assembly remains bolted in place to the upper end of the jet pump. Therefore, in order to install a replacement hold down beam, the lower end of the beam bolt of the replacement beam must first be inserted into the retainer plate in order to properly position the beam with respect to the upper end of the jet pump and the opposed bracket members extending therefrom. Because of the narrow dimensions of the jet pump annulus, manipulation of the replacement beam so as to properly fit within the retainer assembly is difficult to accomplish.

In an effort to expedite hold down beam replacement, apparatus for cutting the beam retainer plate from the jet pump have been proposed. One example of such an apparatus is disclosed in U.S. Pat. No. 4,499,691. This patent discloses a device for cutting the hold down beam retainer plate so that a portion of the severed plate is removed with the beam, whereas the remaining plate-anchoring portion is left coupled to the jet pump. However, because this apparatus involves cutting of the retainer plate adjacent its position of installation on top of the jet pump, operation of this apparatus is accompanied by the risk that metal shards produced incident to retainer plate cutting will become entrained in the surrounding reactor moderator fluid and pumped throughout the reactor, thereby increasing the risk of reactor failure and attendant down time.

In view of the foregoing limitations and drawbacks in the prior art, an object of the present invention is to provide a more expedient and cost-effective apparatus and process for the removal and replacement of jet pump hold down beams.

Another object of the invention is to provide a new method and apparatus for effecting jet pump hold down beam removal and replacement which subjects service personnel to considerably reduced levels of radiation than has heretofore been possible during hold down beam replacement procedures.

Yet another object of the present invention is to provide a variety of end effector apparatus for performing the removal and replacement of jet pump hold down beams from a position remote from the jet pumps, in which the end effectors define a family of jet pump servicing apparatus which are interchangeably connected to the lower portion of a readily manipulable positioning device.

Yet still another object of present invention is to provide a method and apparatus for rotatably fixing the position of the beam bolt of a replacement hold down beam following installation of the replacement beam that avoids altogether the use of welding at the site of beam installation.

SUMMARY OF THE INVENTION

The invention relates generally to apparatus and method for removing and replacing the hold down beam of a fluid-circulating jet pump for a nuclear reactor in which the beams generally have a structure consisting of a beam body, a pair of opposed beam tabs extending outwardly from the beam body, a pair of opposed positioning trunnions, and a threaded beam bolt extending through a correspondingly-threaded channel formed in the beam body. The hold down beams are provided to secure the position of a jet pump between opposed bracket members within an annulus formed between the reactor shroud and the reactor vessel wall. Because the annulus is relatively narrow, being on the order of about 30 cm. (12 in.) wide, and because the jet pumps are immersed in radioactively-contaminated moderator fluid, it is desirable to effect servicing of the hold down beams from a position remote from the nuclear reactor. Accordingly, the invention described herein discloses methods and apparatus for effecting removal and replacement of the hold down beams from a control position above the surface of the moderator fluid so as to minimize health hazards associated with personnel working in close proximity to the nuclear reactor.

The method and apparatus of the invention are particularly beneficial when used in conjunction with reactor fuel removal and replacement ("changeover") procedures, during which a refueling cavity surrounding the reactor and extending from the reactor vessel flange is flooded with moderator fluid such as water to submerge the vessel flange and components contained therein under about 25-30 meters of water following removal of the vessel head from the vessel flange. The disclosed method and apparatus provide for jet pump hold down beam servicing from the refueling bridge extending across the upper end of the refueling cavity above the fluid-filled cavity, thereby further isolating reactor servicing personnel from harmful radiation emitted from the reactor.

One of a family of jet pump hold down beam replacement apparatus comprises a housing having a lower surface configured to be positionable over the body of the beam, means coupled to the housing for engaging the beam trunnions and securing the beam body against the lower surface of the housing, means coupled to the housing for depressing the beam tabs while the beam body is secured against the housing lower surface, means connectable to the housing for remotely and selectively actuating the beam trunnion engaging means and beam tab depressing means, and means for remotely and selectively changing the directional orientation of the beam. In a preferred aspect of this apparatus, the trunnion engaging means comprises a pair of clamps pivotably mounted to the housing. The beam tab depressing means comprises a pair of vertically-oriented hydraulic rams, each of which is capable of applying a force of about 20,000 pounds to each of the beam tabs. The apparatus can further comprise a socket head for rotatably engaging the beam bolt to facilitate beam removal. The socket head is preferably carried by a socket arm rotatably mounted within an aperture formed in the housing. The housing adjacent the aperture and the socket arm are preferably correspondingly keyed so as to selectively rotatably fix the position of the socket arm relative to the housing in order to provide for manipulation of the hold down beam from a position remote from the nuclear reactor.

In instances where the hold down beam is coupled to the jet pump by a beam bolt retainer assembly, the invention further provides an apparatus for uncoupling and removing the retainer assembly along with the hold down beam. This apparatus, which is remotely controllable from a position remote from the nuclear reactor, comprises a housing positionable over the beam and having means for selectively retaining the beam trunnions, means extending from the housing for grasping the jet pump and stabilizing the position of the housing on the jet pump, means coupled to the housing for engaging and rotatably removing the retainer bolt in its entirety from the jet pump, and means for remotely and selectively actuating the jet pump grasping means and the retainer bolt removal means, and for remotely removing the hold down beam, retainer plate and retainer bolt from a position remote from the nuclear reactor. In a preferred aspect of the invention, the retainer bolt removal means comprises a remotely actuable wrench. The wrench is preferably in the form of a ratchet trench and includes a wrench head having a plurality of flats correspondingly shaped to the exterior surface of the retainer bolt. One of the flats is optimally configured to provide a recess for receiving the tack-welded portion of the retainer bolt as the retainer bolt is rotatably withdrawn in its entirety from the jet pump. The jet pump grasping means preferably comprises a clamp having a pair of remotely controllable pincer arms. The pincer arms are pivotably mounted to the housing and are configured to grasp therebetween a flange extending outwardly from the jet pump. A socket head can be provided for rotatably receiving the beam bolt. Following removal of the retainer bolt, the beam bolt can be rotated to draw the retainer into abutment with the lower surface of the beam. The beam, retainer and retainer bolt can then be removed simultaneously from the jet pump.

A new keeper is provided for rotatably securing the position of a bolt extending outwardly from the surface of a support member such as a jet pump hold down beam. The keeper comprises a cylindrical sleeve having at least one open end insertable over an end of the beam bolt and means for coupling the open end of the sleeve to the support surface. The cylindrical sleeve is deformable to frictionally engage the bolt to rotatably secure its position within the support member. In a preferred aspect of the invention, the sleeve securing means comprises a plate mountable to the upper surface of the support member. The plate defines an aperture for receiving the bolt. The surface to the plate adjacent the bolt aperture and the surface of the sleeve adjacent the sleeve's open end are correspondingly-threaded to mutually engage and releasably secure the sleeve to the plate member. In instances where the bolt is externally threaded and received in a correspondingly-threaded channel formed in the support member, the keeper sleeve and bolt are preferably threaded in mutually opposite directions to resist rotation of the bolt within the keeper following sleeve deformation. A flange can be provided adjacent the threaded end of the sleeve to facilitate grasping and removal of the sleeve from the plate.

The sleeve is deformable by a keeper crimper insertable over an end of the cylindrical sleeve. For beam bolts having hexagonally-shaped bolt heads, the keeper crimper preferably provides at least one, and preferably three, deformation flats for deforming the keeper sleeve against a corresponding number of flats of the hexagonal beam bolt.

The invention further relates to a process for remotely removing a jet pump hold down beam tensioned between opposed members in a nuclear reactor. The process is applicable to hold down beams having a beam body, a pair of opposed beam tabs extending outwardly from the beam body, a pair of positioning trunnions, and a threaded beam bolt received within a correspondingly-threaded threaded channel extending through the beam body, in which a lower end of the beam bolt extends through an aperture formed in a bolt retainer plate coupled by a connecting member to the jet pump. The beam bolt is rotatably adjusted within the beam channel so as to urge the beam tabs against the opposed reactor members. The process comprises the steps of grasping the beam trunnions, depressing the beam tabs, rotating the beam approximately 90° about the beam bolt so as to remove the beam tabs from the opposed reactor members, removing the retainer plate connecting member in its entirety, and removing the entire hold down beam, retainer plate, and retainer plate connecting member from the jet pump. In a preferred aspect of this process, all of the specified steps are performed while the refueling cavity in which the reactor is mounted is flooded with moderator fluid such as water and can be controlled from a position remote from the nuclear reactor above the surface of the moderator fluid.

A process is disclosed for remotely installing a replacement jet pump hold down beam between opposed members of the nuclear reactor to secure the jet pump in a predetermined position. The process relates to the installation of beams having a beam body, a pair of opposed beam tabs extending outwardly from the beam body, a pair of opposed beam positioning trunnions, and a threaded beam bolt received within a correspondingly-threaded channel formed within the beam body. The process comprises the steps of positioning a keeper over the beam bolt of the replacement hold down beam and coupling the keeper to the body of the beam, lowering the hold down beam into the reactor to a position adjacent the jet pump and remotely positioning the beam tabs between the opposed reactor members, rotating the beam bolt so as to tension the beam between the opposed reactor members, and crimping the keeper over the beam bolt to rotatably fix the position of the beam bolt within the beam channel. All of the process steps can be performed while the refueling cavity in which the reactor is mounted is flooded with moderator fluid and can be controlled from a position remote from the nuclear reactor and above the surface of the fluid in the cavity.

The invention relates further to a process for removing a jet pump hold down beam positioned between opposed members in a nuclear reactor. The process relates to the removal of beams having a beam body, a pair of opposed beam tabs extending outwardly from the beam body, a pair of positioning trunnions, and a threaded beam bolt extending through a correspondingly-threaded channel formed in the beam body, in which a lower end of the beam bolt extends through an aperture formed in a beam bolt retainer plate that is coupled by a threaded retainer bolt to the jet pump. A lower end of the beam bolt is provided with a flange which extends laterally beyond the retainer plate aperture so as to position the retainer plate between the hold down beam and bolt flange. The hold down beam removal process comprises the steps of rotating the beam tabs approximately 90° from the opposed reactor members, rotatably removing the retainer bolt in its entirety from the jet pump, rotating the beam bolt in a predetermined rotational direction to advance the retainer plate toward the hold down beam, and removing the hold down beam, retainer plate and retainer bolt from the nuclear reactor.

BRIEF DESCRIPTION OF THE DRAWINGS

The various objects, advantages, and novel features of the present invention will be more clearly understood from the following detailed description when read in conjunction with the accompanying drawings, in which:

FIG. 7 is a sectional side view of a hold down beam and beam bolt retainer removal tool of the present invention mounted adjacent an installed jet pump hold down beam;

FIG. 8 is a side view illustrating in section particular features of the apparatus depicted in FIG. 7;

FIG. 9 is a view along the line 9—9 of FIG. 7;

DETAILED DESCRIPTION OF THE PREFERRED EMBODIMENTS

Figure 1:
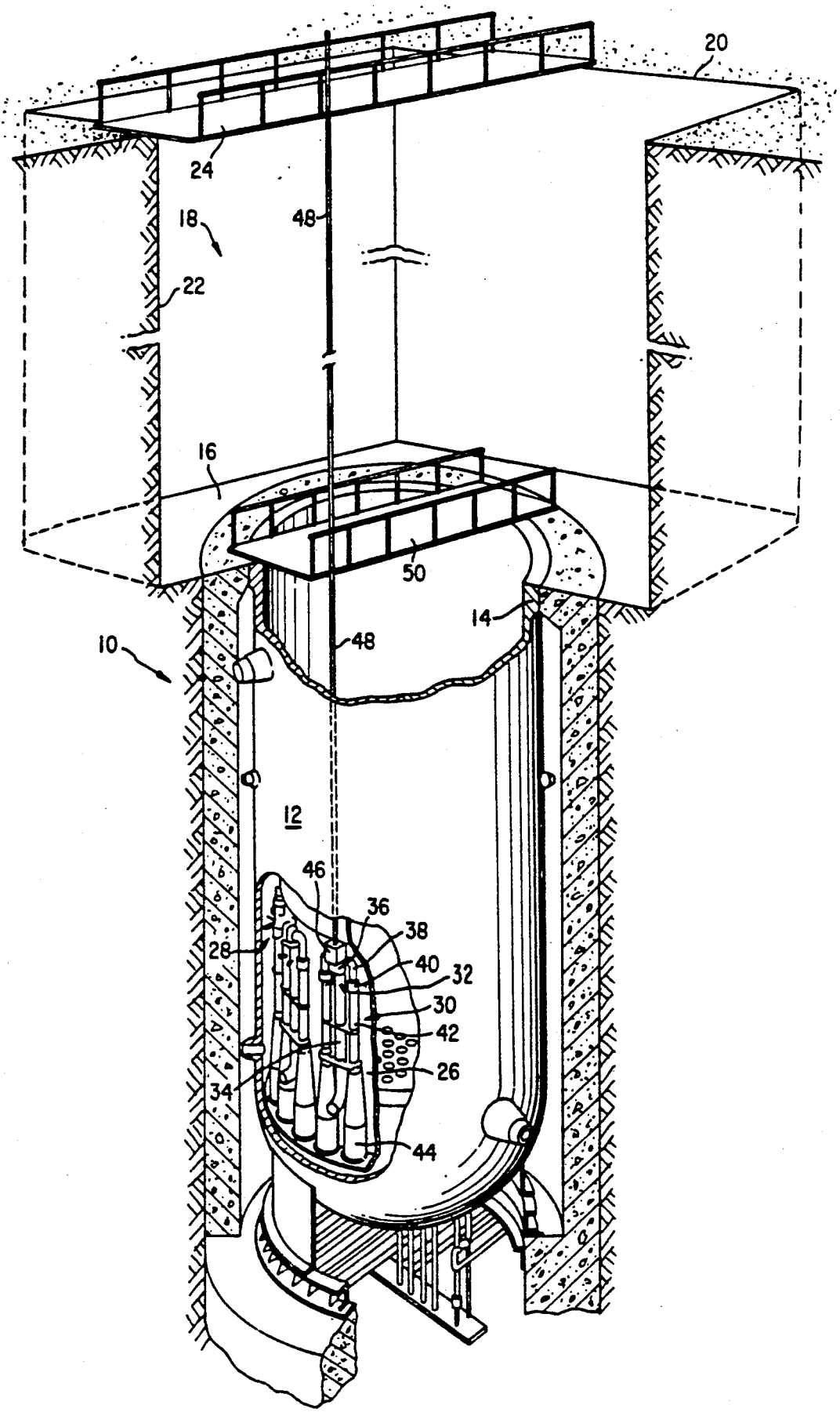
FIG. 1 is a partially cut away, perspective view of a nuclear power plant in which use of the invention is particularly applicable.

With reference to the drawings, wherein like reference numerals represent like components throughout the various drawing figures, and with particular reference to FIG. 1, a boiling water reactor in which the method and apparatus of the present invention are applicable is depicted in schematic form and designated generally by reference numeral 10. Details of the reactor structure which are not relevant to the description of the invention are not depicted in the drawing. It is to be appreciated, however, that the method and apparatus described hereinbelow are not to be construed as being limited solely to use in boiling water reactors. The reactor 10 includes a generally cylindrical reactor vessel 12 which is removably sealed by a vessel head (not shown) at the vessel flange 14. The reactor vessel 12 houses various reactor components and, when the vessel head is coupled thereto, isolates these components from the external environment to provide a generally closed reactor system. The reactor vessel 12 is mounted in the floor 16 of a selectively floodable refueling cavity 18. The refueling cavity 18 is flooded with a suitable moderator fluid such as water prior to removal of the reactor vessel head and replacement of the reactor fuel supply. The refueling cavity 18 extends from a surface 20 and is defined by sidewalls 22 which typically extend a distance of from about fifteen to about thirty meters from the floor 16 to the surface 20. The reactor refueling bridge 24 extends between the cavity sidewalls 22 and provides a work area from which reactor replenishment of fuel and the jet pump hold down beam servicing of the present invention are controlled. The moderator fluid filling the refueling cavity 18 provides for absorption of radioactive emissions from the reactor vessel following vessel head removal. A containment vessel (not shown) can optionally be provided to further isolate the reactor vessel.

The reactor vessel houses a generally cylindrical reactor core shroud 26 spaced from the vessel wall. An annulus 28 is provided between the core shroud 26 and reactor vessel 22. The annulus 28 is substantially filled with a suitable reactor moderator fluid such as water which is circulated throughout the reactor by a plurality of jet pump assemblies 30. Each jet pump assembly comprises a pair of jet pumps 32 which are fed with a supply of fluid through an inlet riser 34. Fluid passing through the inlet riser 34 is delivered to each of the pumps 32 through a riser manifold 36 positioned atop the inlet riser. The riser manifold 36 directs fluid into two opposed inlet mixers 38 which re-direct the fluid flow downward past a venturi nozzle 40 and into a pump throat 42. Fluid flows from the throat 42 into a diffuser 44 into the lower periphery of the reactor core (not depicted). A boiling water reactor typically includes as many as ten or more jet pump assemblies 30 circumferentially spaced about the annulus 28. Each jet jump 32 of the pump assembly 30 is capable of pumping approximately 75,500 liters (20,000 gallons) of moderator fluid per minute to effect uniform cooling of the reactor.

In accordance with the present invention, the jet pumps 32 are serviceable by one of a plurality of end effector tools, depicted generally box 46, interchangeably mounted at the lower end of a modular, readily assembleable rigid pole 48 such as that of the type manufactured by ASEA-ATOM of Vasteras, Sweden. The end effectors 46 can be manipulated into a desired position adjacent the jet pumps 32 from the reactor refueling bridge 24, thereby dispensing with the need to install a service platform 50 across the reactor vessel flange 14 following draining and decontamination of the refueling cavity 18, as required in prior servicing processes. One or more remotely controllable video cameras (not depicted) can be submerged in the moderator fluid and controlled from the refueling bridge 24 to assist in guiding the end effector tools 46 into position adjacent the jet pumps. The ability to service the jet pump 32 from a position as remote from the jet pumps 32 as that of the refueling bridge 24 is particularly advantageous, for working from such a position, through approximately 25-30 meters of moderator fluid when the refueling cavity 18 is filled with water, greatly reduces the exposure of reactor servicing technicians to radioactive emissions from the reactor. Further, because the effector tools 46 can be accurately and effectively positioned from the refueling bridge while the refueling cavity is still filled incident to vessel head removal, jet pump servicing can be conducted in a manner which altogether avoids the time, expense, and resources associated with draining and decontamination of the refueling cavity, as is required in prior art jet pump servicing techniques.

Figure 2:
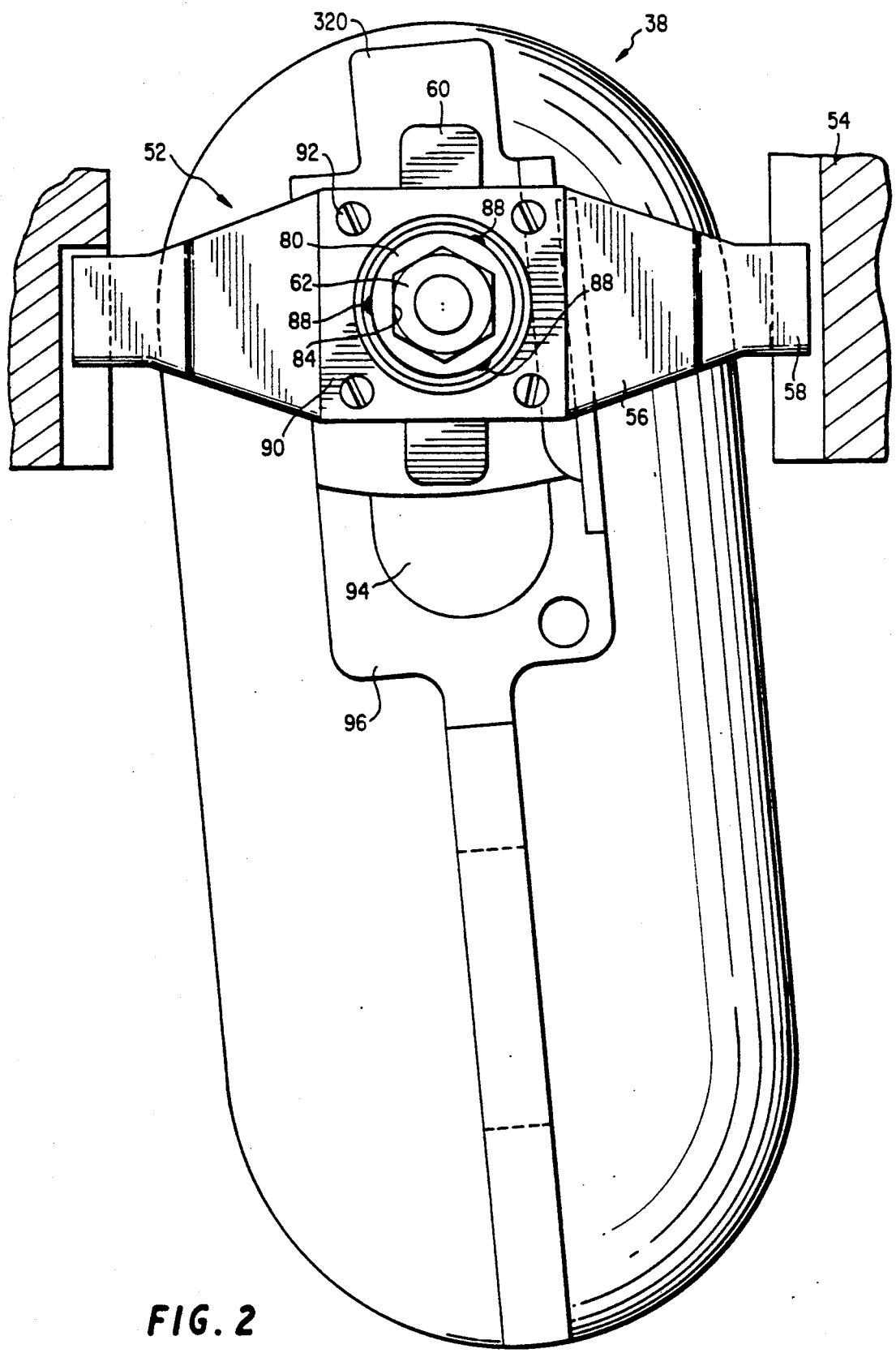
FIG. 2 is a top, elevational view of a jet pump and jet pump hold down beam illustrating details of the beam and beam mounting within the reactor annulus.
Figure 3:
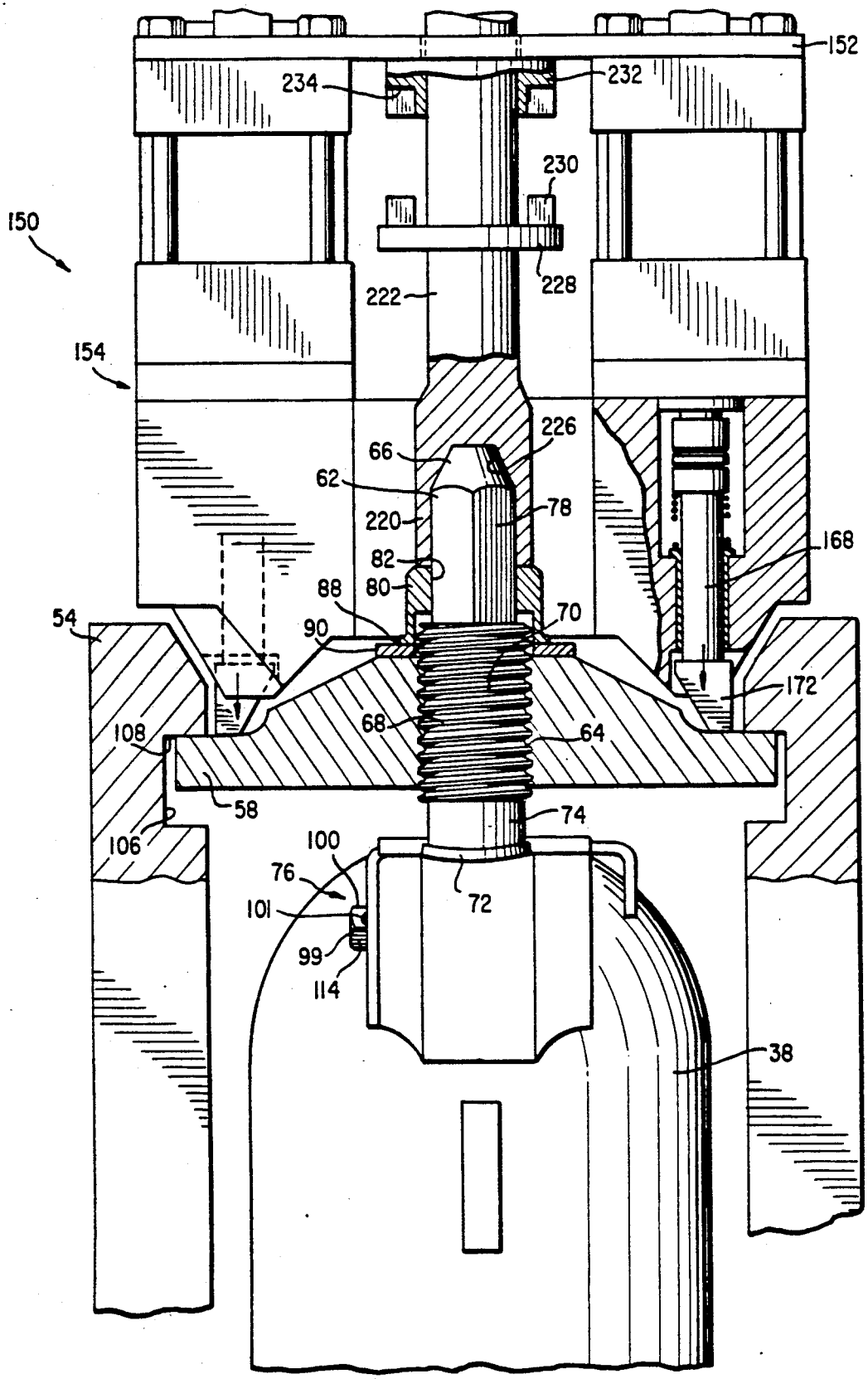
FIG. 3 is a partial sectional side view of a jet pump hold down beam tensioning tool illustrating details of both the tensioning tool and of the hold down beam mounting arrangement.

With reference to FIGS. 2 and 3, there is depicted a jet pump hold down beam 52 and its mounting arrangement between a pair of opposed riser brackets 54 extending from the riser manifold 36. One hold down beam 52 is provided to secure the inlet mixer 38 of each jet pump 32 within the riser manifold 36. Each hold down beam 52 comprises a beam body 56 from which extend along a longitudinal axis of the beam a pair of opposed beam tabs 58. Extending transversely of the longitudinal axis from the beam body is a pair of opposed beam positioning trunnions 60 for facilitating grasping and maneuvering of the hold down beam relative to the jet pump 32. A threaded beam bolt 62 extends through a correspondingly-threaded channel 64 formed in the beam body 52. The beam bolt comprises a bolt head 66, a bolt body 68 having a threaded exterior surface 70, and a convex bolt flange 72 which extends transversely outwardly from an end of the bolt opposite that of the bolt head 66. The portion of the beam bolt 62 between the threaded bolt body 68 and flange 72 defines a recess 74 for receiving a bolt retainer assembly 76. The bolt head 66 is typically provided with a plurality of facets 78 arranged so as to provide a hexagonal cross-sectional configuration. A bolt keeper 80 defining a keeper aperture 82 dimensioned to receive the bolt head 66 can be provided to rotatably fix the position of the beam bolt following beam installation. The keeper aperture 82 preferably includes a plurality of aperture side walls 84 dimensioned and configured to closely surround the beam bolt facets 78. The keeper 80 is typically tack welded at one or more weld sites 88 to a keeper plate 90 secured to an upper surface of the beam body 56 by a plurality of threaded fasteners 92.

Figure 10:
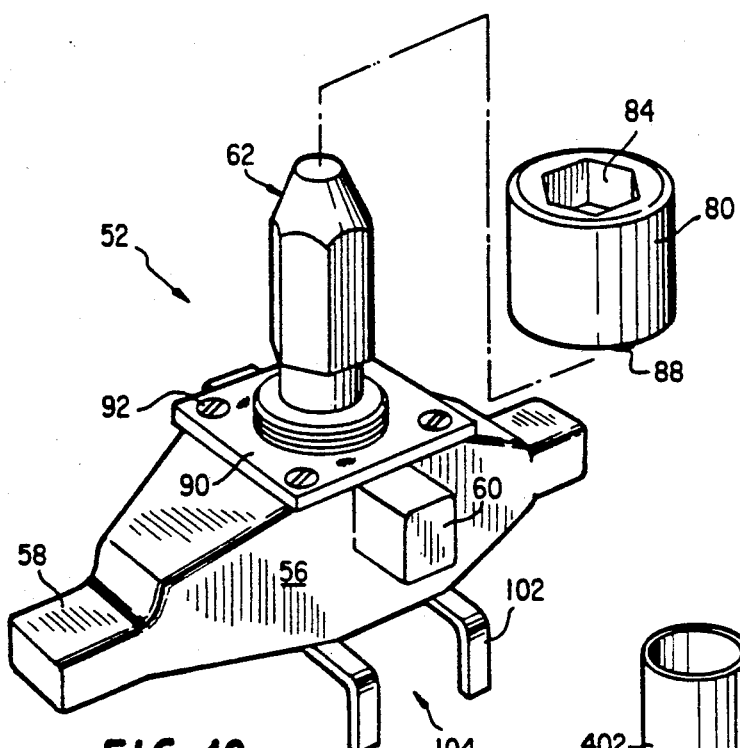
FIG. 10 is a partially exploded perspective view of a prior art jet pump hold down beam and beam bolt keeper to which the method and apparatus of the present invention are applicable.

The hold down beam 52 is initially installed adjacent the upper end of the jet pump inlet mixer 38 such that the flanged end 72 of the beam bolt 66 abuts against a concave recess formed in a channel surface 94 formed in a flange 96 extending outwardly from the inlet mixer. The position of the bolt 62 within the channel 94 is stabilized by the bolt retainer assembly 76. The bolt retainer assembly 76 comprises a retainer plate 98 which is coupled to the inlet mixer 38 by a threaded retainer bolt 99 extending through a retainer plate aperture and a correspondingly-threaded cavity formed in the inlet mixer 38. The head 100 of the retainer bolt 99 is usually secured to the retainer plate 98 by a tack weld 101 along one of the plurality of flats 114 of the retainer bolt head 100. The retainer plate 98 includes a pair of fork members 102 (FIG. 10) which are spaced apart from one another to define an open-ended channel 104 dimensioned to receive therein the bolt recess 74. The beam 52 is tensioned between the riser brackets 54 by positioning the beam tabs 58 within a notched recess 106 formed in each of the riser brackets and rotatably adjusting the beam bolt 62 so as to urge the beam tabs into a abutment with a notch shoulder 108 to provide the desired downwardly-directed hold down force against the inlet mixer 38.

Beam Tensioning Tool

With reference to FIGS. 3-6, there is depicted a jet pump hold down beam tensioning end effector tool, designated in general by reference numeral 150, for providing for the remote removal and installation of a hold down beam. The beam tensioning tool 150 constitutes one of the plurality of end effector tools 46 depicted generally in FIG. 1 for servicing jet pump hold down beams. The beam tensioning tool 150 is interchangeably connectable in a conventional manner to a lower end of the pole 48 to permit tool manipulation relative to the jet pump and hold down beam from a position such as that of the refueling bridge 24 remote from the reactor flange 14, jet pump, and hold down beam. This arrangement greatly facilitates hold down beam removal and installation, for it permits servicing of the hold down beams without having to drain moderator fluid from the refueling cavity 18 following vessel head removal, decontaminate the cavity walls and floor, and assemble a separate service platform 50 across the vessel flange 14 prior to servicing, as is required in prior, known techniques. Manipulation of the tool 150 from the refueling bridge 24 provides a further advantage in isolating service technicians from radioactive sources, thereby reducing their exposure to harmful radiation.

The beam tensioning tool 150 comprises an upper support plate 152 which mounts a pair of transversely-extending rams 154. The rams 154 are preferably in the form of hydraulic rams, each comprising a high pressure cylinder 156, a cylinder body 162 extending from the cylinder 156, and a push rod 168 reciprocably received within the cylinder body 162. The outwardly extending end of the push rod 168 defines a contact head 172 dimensioned to concentrate the force generated by the cylinder to act over a small contact surface. In a preferred embodiment, the contact head has a generally right-triangular configuration with a flattened terminal surface so as to deliver the force generated by the rams 154 to a small surface area of a hold down beam, as is described in greater detail below. Quick-disconnect fittings 176 are provided for each of the hydraulic rams 154 to provide for ready coupling of control lines for remote control, as from refueling bridge 24 (FIG. 1), of the operation of the rams. Fluid lines 177 provide for the transport of cylinder fluid to the rams 154 to direct push rod reciprocation relative to the cylinder body 162.

The ram cylinder bodies 162 are formed within a tool housing 180 that is coupled to a lower end of the cylinder 156 by fasteners 184. The fasteners 184 can be in the form of threaded fasteners such as bolts which extend through correspondingly-dimensioned apertures formed in a cylinder flange 186 and into correspondingly-threaded apertures formed in the tool housing 180. A cavity 188 is formed in the tool housing between the cylinder bodies 162 that is dimensioned to receive the beam bolt 62 of a hold down beam 52 over which the tool 150 is positioned. The lower, free end 190 of the tool housing 180 adjacent the beam bolt cavity 188 is configured to provide a generally flat beam support surface 190a for resting against the flat upper edge 56a of the beam body 56. The beam support surface 190a extends laterally outwardly from the bolt cavity 188 and is continuous with an edge 190b that is angled outwardly from the tool housing 180 at an angle generally similar to the angle the tapered surface 56b of the beam extends from the upper edge 56a of the beam. The laterally outwardly extending edge 190b is configured to engage the lateral surface of the beam body taper 56b upon grasping of the beam positioning trunnions 60 by trunnion engaging means, designated generally by reference numeral 194.

The trunnion engaging means 194 comprises a pair of hooks 196, each of which is pivotably coupled by a pivot pin 198 to the side 199 of the tool housing 180. The hooks 196 are selectively movable between a retracted position, as shown in solid line in FIG. 4, and a trunnion-engaging position, as depicted in phantom in the drawing, by appropriate reciprocably extensible means such as an hydraulic cylinder 200. Each of the hooks 196 includes an upper arm 196a coupled by pin 198 to a lower, trunnion-engaging arm 190b. A free end 202 of a cylinder piston 204 reciprocably extensible in a body 206 of the cylinder is pivotably coupled by a pivot pin 208 to the upper arm 196a of hook 196. The back end 206a of the cylinder body 206 is pivotably mounted to the side 199 of the tool housing 180 by a suitable pivot bracket 210, whereas the front end 206b is uncoupled to the tool housing 180. The hook displacement cylinder 200 is therefore itself pivotably coupled to the corresponding side of the tool housing 180 to pivot upon extension of the piston 204 from a hook retracted position, as shown in solid line, to a trunnion-engaging position, as shown in phantom. Fluid lines 205 leading to and from the cylinder body 206 allow for control of the supply of operational fluid to the cylinder 200 incident to reciprocation of piston 204 from a position, such as from refueling bridge 24 at the top of the filled refueling cavity, remote from the tool. In the preferred embodiment of the invention, the cylinder 200 and upper arm 196a of hook 196 are positioned adjacent an exterior surface of the housing side 199, whereas the lower, trunnion-engaging arm 196b of the hook is positioned adjacent an interior surface of the end plate to facilitate tool fabrication, servicing, and operation. Extension of the hooks 196 into the trunnion-engaging position enables the tool 150 to firmly grasp and secure the hold down beam 52 against the lower end 190 of the tool housing 180. Engagement of the beam trunnions 60 in this manner also positions the beam bolt 62 within the tool cavity 188 and positions the push rod contact heads 172 closely adjacent the beam tabs 58.

A socket head 220 extending from a lower end 222a of a support arm 222 is reciprocably extensible through an aperture 224 formed in the support plate 152. The upper end 222b of the support includes means, such as key slot 223, for coupling the support arm to a lower end of the tool positioning pole 48 (FIG. 1) correspondingly configured to receive a key inserted through the key slot 223. The socket head 220 defines a socket cavity 226 configured and dimensioned to receive the hexagonal head 66 of the beam bolt 62. The socket support arm 222 carries a flange 228 having a pair of flange extensions 230 which extend from the flange toward the support plate 152. A collar 232 surrounding the support plate aperture 224 extends from the support plate toward the tool cavity 188. The collar 232 includes a pair of recesses 234 dimensioned to receive the socket flange extensions 230 upon proper rotational alignment of the flange extensions with the collar recesses and retraction of the support arm 222 to the position depicted in FIG. 4. The collar 232 and support arm flange 230 are therefore correspondingly keyed to rotatably fix the position of the support arm 222 within the support plate aperture 224. However, it is to be appreciated that any of a variety of known keying arrangements for rotatably fixing two mutually rotatable elements can be utilized in lieu of the flange extension and collar recess arrangement discussed above. Rotatable fixing of the support arm 222 in this manner fixes the position of the beam tensioning tool at the end of the pole 48 and permits for the manipulation of the tool 150 into abutment with an installed jet pump hold down beam from a position remote from the beam.

Once the beam tensioning tool 150 has been properly positioned over an installed hold down beam such that the beam bolt 62 extends into the tool cavity 188 and the beam support surface 190a of the tool housing 180 abuts against the upper surface 56a of the beam, hook displacement cylinders 200 are remotely actuated so as to direct the trunnion-engaging hooks 196 to pivot about pivot pin 198 to graspingly-engage the beam trunnions 60 and secure the upper surface of the beam against the beam support surface 190a of the tool housing 180. Once trunnion engagement by the hooks 196 has been confirmed, as can be accomplished by one or more remotely controlled cameras positioned adjacent to the beam, the hydraulic rams 154 are actuated to direct the push rod contact heads 172 into engagement with the beam tabs 58, as shown in FIG. 3. Each of the rams is controllable to apply a pressure against the beam tab of up to about 9,100 kg (20,000 lbs.) so as to deflect the beam tabs downward from the riser bracket notch shoulder 108 a distance of about 0.76 mm. (0.030 inch). While the trunnion-engaging hooks 196 are engaged with the beam trunnion 60 and the hydraulic rams 154 are exerting a downward force sufficient to deflect the beam tabs 58, the socket arm 222 is lowered so as to position the socket head 220 over the hexagonal head 66 of the beam bolt 62. The socket arm 222 is remotely rotated with sufficient torque to break the tack weld 88 coupling the bolt keeper 80 to the keeper plate 90. Breaking of the tack weld 88 in this manner allows for the rotation of the beam bolt incident to further beam removal procedures described below.

Figure 4:
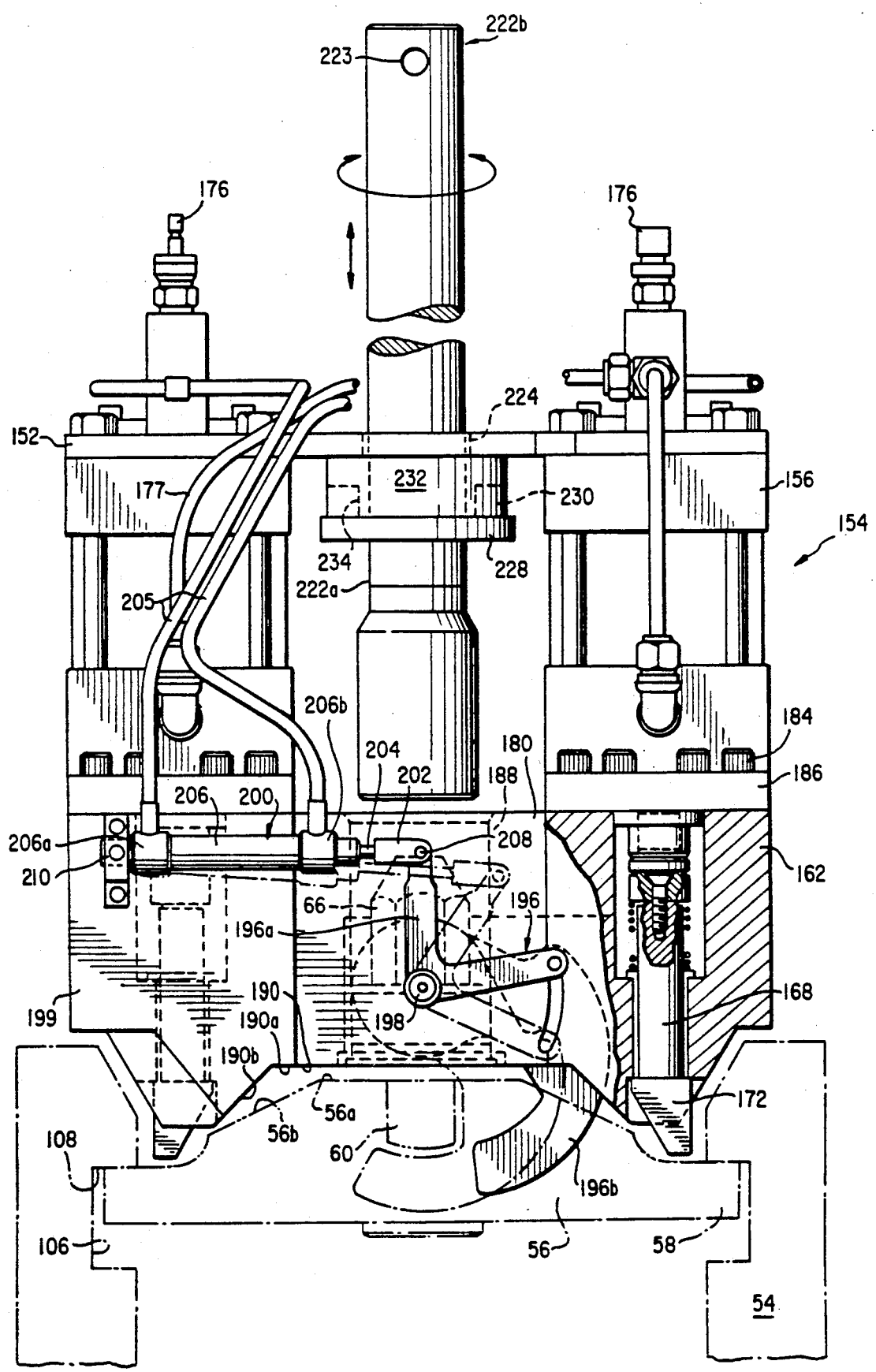
FIG. 4 is a sectional side view of the beam tensioning tool depicted in FIG. 3 illustrating details of the beam grasping apparatus.
Figure 5:
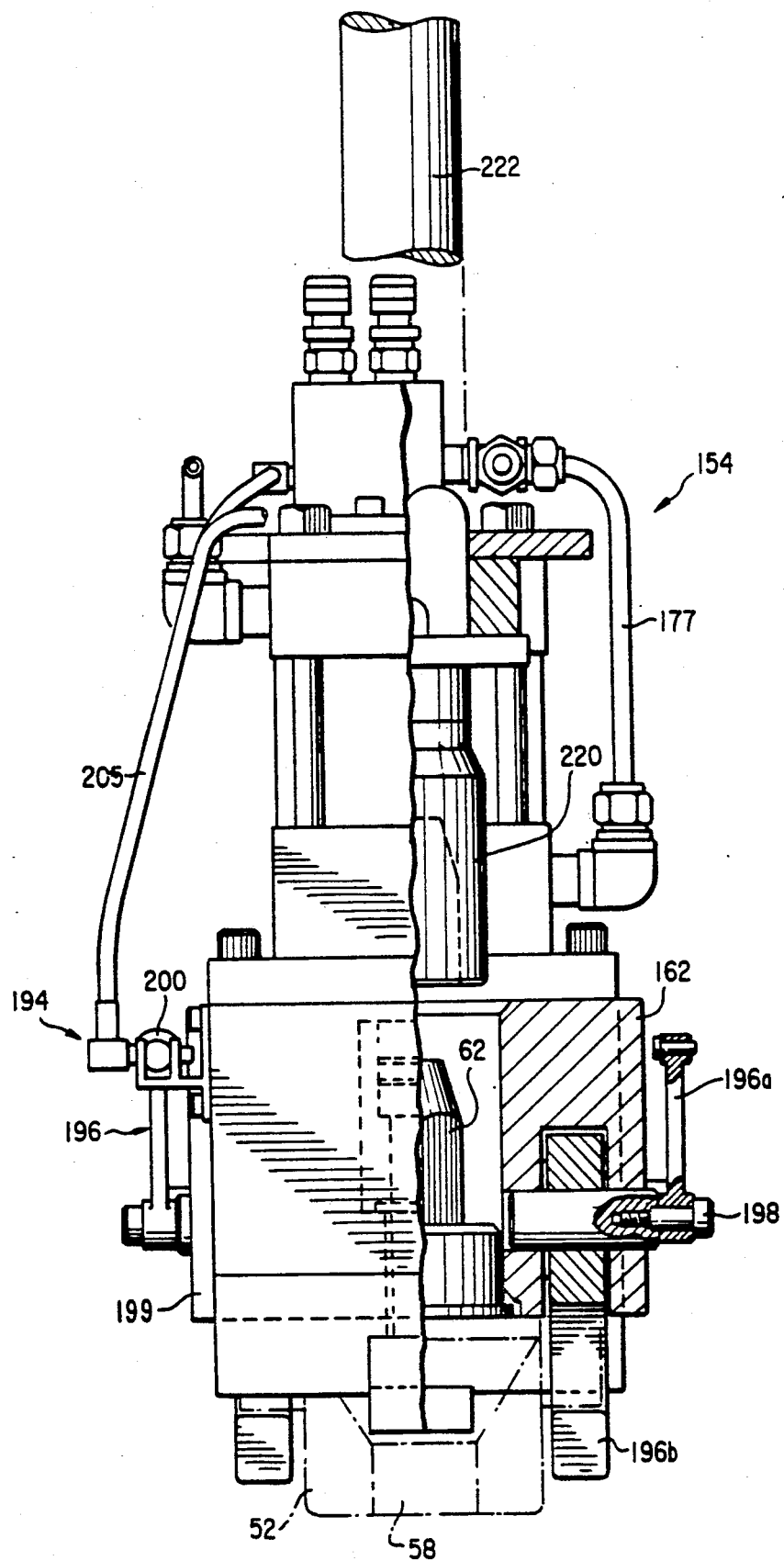
FIG. 5 is a partial sectional side view of the beam tensioning tool depicted in FIGS. 3 and 4.
Figure 6:
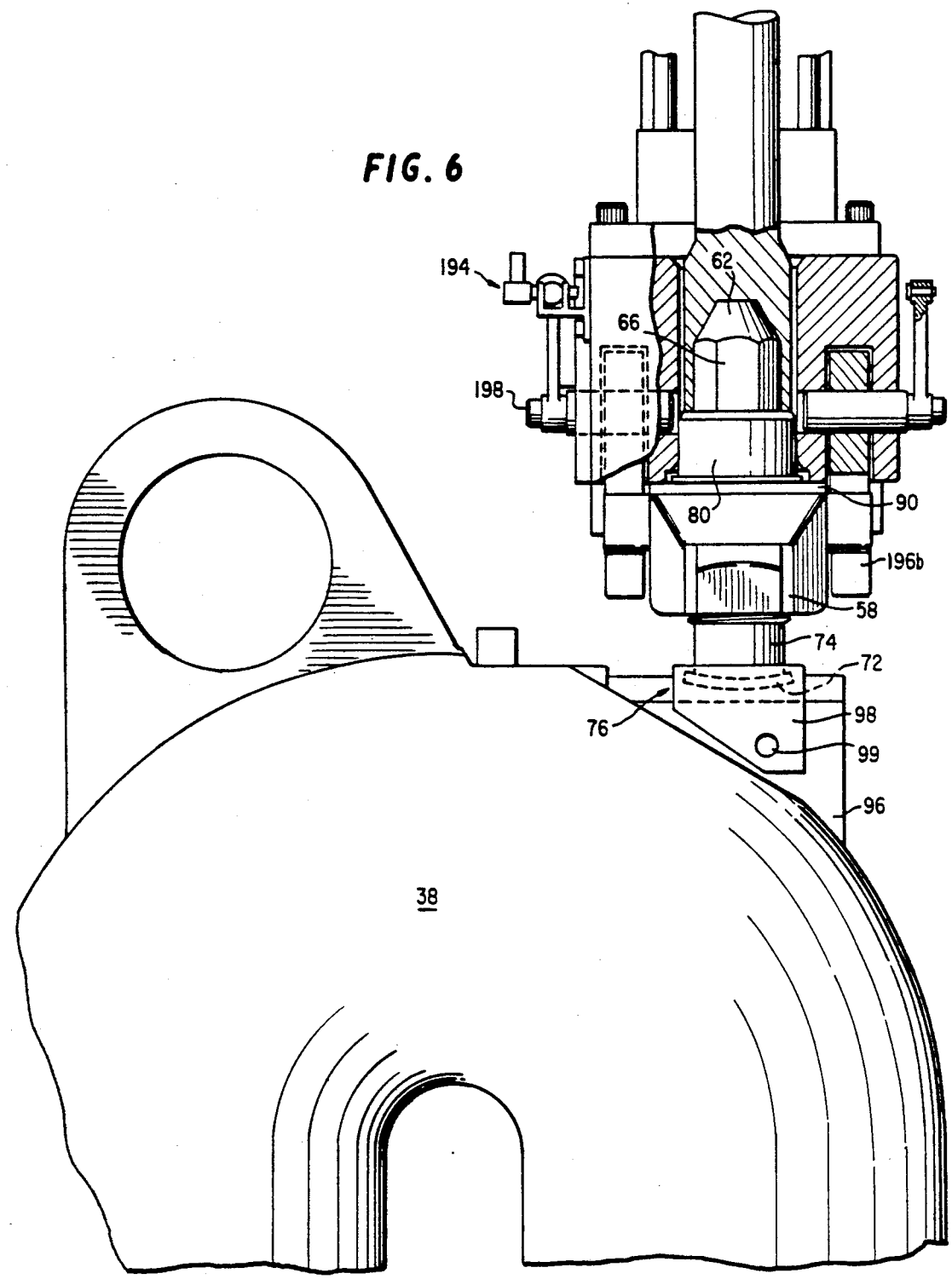
FIG. 6 is a partial sectional side view of the beam tensioning tool depicted in FIGS. 3-5 illustrating further details of the tensioning tool and of the hold down beam mounting arrangement.

Once the track weld 88 has been broken, the entire beam tensioning tool 150 is rotated approximately 90° so as to swing the beam tabs 58 from under the riser bracket shoulder 108. Tool rotation is accomplished by retracting the socket support arm 222 to the retracted position, as shown in FIG. 4, so that the correspondingly-keyed portions of the socket arm flange 228 and support plate collar 232 mutually engage to render the socket arm 222 non-rotatable within the tool aperture 224. The socket arm 222 can then be rotated, either manually or with the aid of appropriate mechanical apparatus, to move the deflected beam tabs from the riser brackets 54. Once the beam tabs 58 have been rotated from the riser notch 106, the hydraulic rams 154 are deactivated so as to retract the push rod contact heads 172 from the surface of the beam tabs 58. However, because the lower portion of the beam bolt 62 is coupled to the bolt retainer assembly 76 at the bolt flange 72, the beam cannot be removed from the jet pump until further measures are taken to uncouple the bolt retainer assembly from the beam bolt. Although the beam bolt can be uncoupled from the bolt retainer assembly 76 by cutting the retainer assembly or twisting the bolt free from the retainer plate fork members 102 (FIG. 10), as discussed above, it is desirable to remove the retainer assembly 76 in its entirety from the jet pump inlet mixer 38 so as to avoid altogether the generation of metal shards incident to cutting procedures and to facilitate subsequent beam installation and removal procedures.

The beam tensioning tool is removed by deactivating the hook displacement cylinder 200 so as to withdraw the trunnion-engaging hooks 196 to the retracted position depicted by the solid line in FIG. 4. The support arm 22 is elevated and rotated to direct the arm flange 228 into mutual keyed abutment with the support collar 232 to permit elevation of the support arm 222 and entire beam tensioning tool 150 from the hold down beam 56.

Jet Pump Retainer and Beam Removal Tool

Details of an end effector tool according to the present invention for removing in its entirety a beam bolt retainer and hold down beam coupled thereto are depicted in FIGS. 7-9. The retainer and beam removal tool, designated generally by reference numeral 250, represents one of a family of end effector tools 46 depicted generally in FIG. and is utilized in instances where a beam bolt retainer assembly, such as the retainer assembly 76 described above, is provided to retain the lower end of the beam bolt at a prescribed position relative to the inlet mixer 38 of the jet pump. The retainer and beam removal tool 250 is interchangeably connectable in a conventional manner to a lower end of pole 48 (FIG. 1) to permit for manipulation of the tool from a position such as the refueling bridge 24 remote from the reactor vessel 12 and enclosed jet pump hold down beam. The tool 250 includes a tool housing 252 comprising a pair of side plates 254 connected along their respective back ends to define a beam-receiving cavity 256 accessible from a generally open front end 258 of the housing. Each of the side plates 254 defines a generally U-shaped channel 260 arranged such that its open end extends to the front end 258 of the housing. The channels 260 are continuous with the beam-receiving cavity 256 and are appropriately spaced and dimensioned to receive the pair of transversely-extending beam trunnions 60 following beam detensioning and rotation from the riser brackets 54, as set forth above. The open end 262 of each channel 260 is selectively closeable by channel closing means 264, such as a cylinder 268 having a piston 266 reciprocably extensible across the channel opening. Extension of the piston 266 across the channel opening, as depicted in FIG. 7, prevents inadvertent removal of the beam 52 from the tool cavity 256 once the tool has been properly positioned over the beam, as well as during the course of beam removal from the jet pump, as described in greater detail below.

Coupled to one of the side plates 254 is a retainer bolt removal assembly, designated generally by reference numeral 280. The retainer bolt removal assembly 280 includes a wrench 282 which carries a wrench head 284 having a transversely-extending channel 286 dimensioned to engage and receive the head 100 of the retainer bolt 99 upon placement of the wrench head over the retainer bolt and actuation of the wrench 282, as is described in greater detail below. One of the wrench head channel walls 288, such as wall 288a, is provided with a recess 290 which extends substantially the length of the channel wall for receiving the portion of the bolt head 100 carrying the tack weld 101 (FIG. 3). The wrench head 284 is carried by a wrench support arm 292 that is fastened by conventional fastening devices to one of the pincer arms 294 of a tool stabilizing clamp, designated generally by reference numeral 296. Movement of the clamp arms 294 toward one another, as upon clamp closure in the manner described below, shifts the wrench head 284 from a retainer bolt disengaged position to a position of retainer bolt engagement, as depicted in FIG. 8.

The wrench 282 is pivotably coupled by a pivot pin 300 to the piston 302 of a fluid actuated cylinder 304. Cylinder 304 is preferably a hydraulically-actuable cylinder which can be remotely controlled to direct reciprocation of the piston 302 in the direction of the arrow depicted in FIG. 7. Wrench head 284 preferably includes a ratchet mechanism 308 so that bolt loosening torque is directed from the wrench head 284 to the retainer bolt head 100 during piston extension from the cylinder 296. The ratchet mechanism 308 operates so as to return the wrench 282 to a bolt loosening position without undue rotational movement of the bolt head as the piston 302 is withdrawn into the cylinder. Approximately sixty reciprocable extensions of the piston 302 are required in order to back the threaded retainer bolt 99 in its entirety from the correspondingly-threaded cavity formed in the inlet mixer 38.

The tool stabilizing clamp 296 is provided to stabilize the retainer bolt and beam removal tool 250 with respect to the inlet mixer 38 of the jet pump once the tool 250 has been positioned over a detensioned jet pump hold down beam. The clamp 296 comprises a pair of pincer arms 294 pivotably mounted to one another by a pivot 312 carried by respective arm flanges 314. A lower end of each of the arms 294 carries a rail 316 dimensioned to engage the outwardly-extending shoulder 320 of the inlet mixer flange 96 (FIG. 2). A remotely operable fluid actuated cylinder 322 directs relative movement of the pincer arms 294 about pivot 312. The cylinder 322 comprises a piston 324 reciprocably extensible with respect to a cylinder body 326. The outwardly-extending end of piston 324 is coupled to an upper end of one of the pincer arms, such as arm 294a, whereas the cylinder body 326 is coupled to the other pincer arm 294b at the upper end thereof. This arrangement provides a sufficient mechanical advantage for grasping and retaining of the inlet mixer flange shoulder 320 for tool stabilization throughout ratchet removal of the retainer bolt 99.

Coupled to pincer arm 294a by fastener 330 is a cylindrical support frame 332 for the wrench actuation cylinder 304. The support frame defines an aperture 334 in which is gimballed at a pin 336 a trunnion 338 to which the wrench actuation cylinder 304 is coupled. Because the piston 304 is coupled to wrench 282 at a single pivot point at pin 300, the directional forces generated as a result of reciprocation of the piston 302 and ensuing arcuate movement of the wrench 282 are transferred to the trunnion 338, resulting in pivoting of the trunnion about pivot pin 336.

Quick-disconnect fittings 342 coupled to tool housing 252 are provided for each of the channel closing cylinders 268, tool stabilizing clamp cylinder 296, and wrench actuation cylinder 304 to provide for ready coupling of cylinder control lines thereto in order to effect control of the actuation of the cylinders from a position, such as the refueling bridge 24 (FIG. 1), remote from the reactor flange 14 and the jet pump hold down beam 52. A fluid line 344 extending from each of the fittings 342 to a corresponding one of the cylinders 268, 296 and 304 is provided to convey control signal input from the fitting to the cylinder. Control signal input is preferably in the form of fluid pressure at appropriate pressure levels to effect actuation of the respective cylinders 268, 296 and 304 in a desired manner.

Once the retainer bolt 99 has been rotatably withdrawn from the inlet mixer 38 into the bolt channel 286 of the wrench head 284, the hold down beam 52 is no longer physically coupled to the jet pump. Prior to beam removal, it is desirable to secure the retainer plate 98 to the beam 52 so that the beam, retainer plate 98, and retainer bolt 99 can be removed together from the jet pump in a single step without the aid of additional end effector tools. The tool 250 includes a socket head 346 positioned at the lower end 348a of a socket arm 348 for rotatably engaging the beam bolt 62. The upper end 348b of the socket arm 348 is provided with means, such as key slot 349, for coupling the support arm to a lower end of the tool positioning pole 48 (FIG. 1) which is configured to receive a key inserted through arm slot 349. The socket head 346 defines a socket cavity 350 dimensioned to receive the hexagonal head 66 of the beam bolt upon lowering of the socket head over the beam bolt. Because the bolt flange 72 extends laterally outwardly beyond the retainer plate channel 104 and partially across the width of the retainer plate forks 102, rotation of the socket arm 348 in the prescribed direction effects rotation of the beam bolt 66 so as to elevate the retainer plate 98 into abutment with a lower end of the beam 52. The spatial relationship between the hold down beam 52, retainer plate 98, and wrench head 284 is such that as the retainer plate is moved into abutment with the lower surface of the hold down beam, the bolt-receiving end of the ratchet head 284 is obstructed by the retainer plate 98, thereby capturing the retainer bolt 99 within the bolt channel 286 of the wrench head.

The socket arm 348 carries a flange 354 having a pair of flange notches 356 extending outwardly therefrom toward a tool support plate 360 coupled to the housing side plates 254. The support plate 360 defines an aperture 362 through which the socket arm 348 is reciprocably extensible. A collar 364 circumscribes the aperture 362 and is formed with a pair of recesses 366 correspondingly dimensioned and positioned so as to receive the flange notches 356 upon rotational alignment of the flange notches 356 with the collar recesses 366. The flange 354 and collar 364 are therefore correspondingly keyed to rotatably fix the position of the socket arm 348 relative to the tool 250. Other keying arrangements known in the art for selectively rotatably fixing mutually movable elements can be substituted in lieu of the notch and recess arrangement discussed above. Once the socket arm 348 has been rotatably fixed relative to the collar 364, the hold down beam 52, retainer plate 98 and retainer bolt 99 can be removed together in their entirety upon further lifting and manipulation of the socket arm 348. Removal of the hold down beam and retainer assembly 76 in this fashion allows for the ready installation of a replacement hold down beam, as the beam bolt of the replacement beam need not be installed within a retainer assembly.

Bolt Keeper

Figure 11:
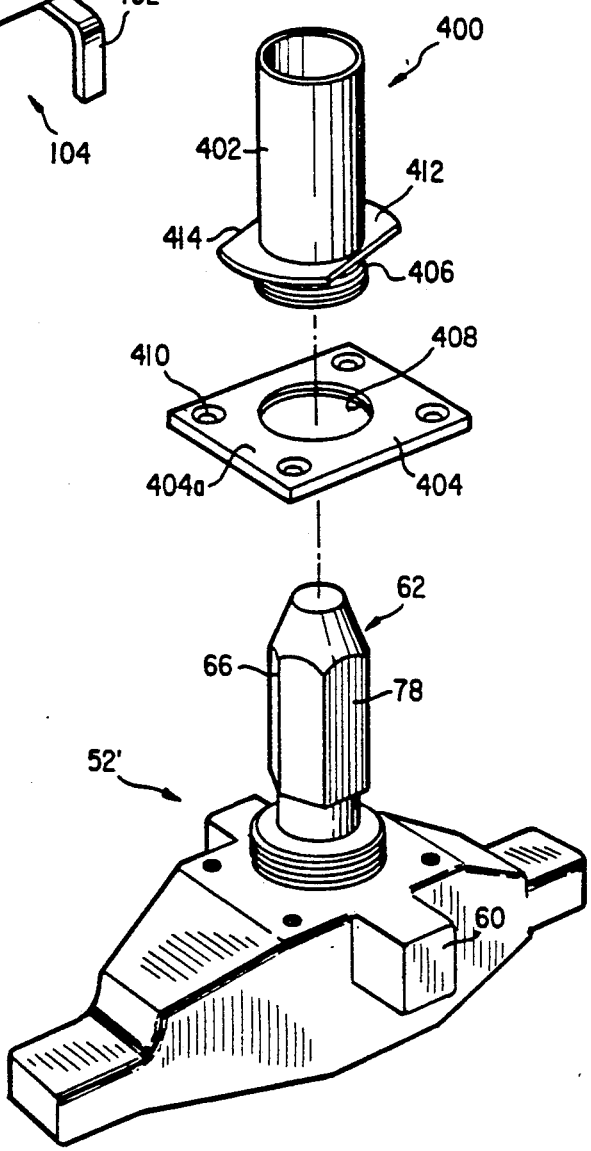
FIG. 11 is a partially exploded perspective view of a jet pump hold down beam having a modified beam bolt keeper in accordance with certain aspects of the present invention.
Figure 12:
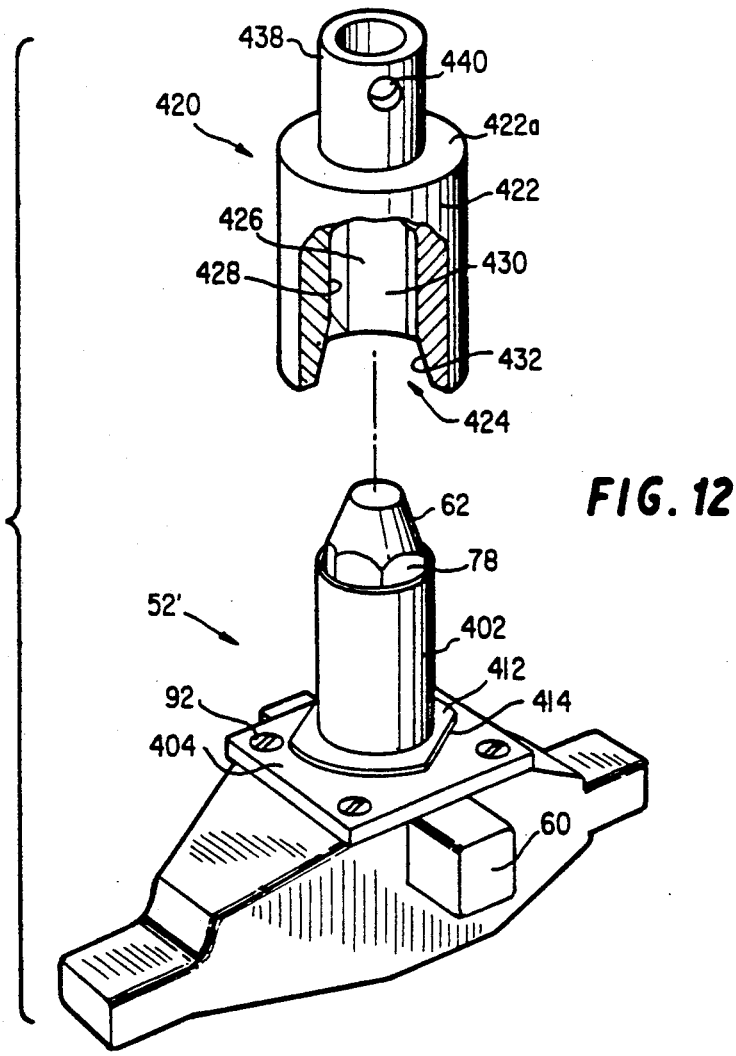
FIG. 12 is a perspective view illustrating an installed beam bolt keeper and in partially cut away view a keeper crimper in accordance with the present invention.
Figure 13:
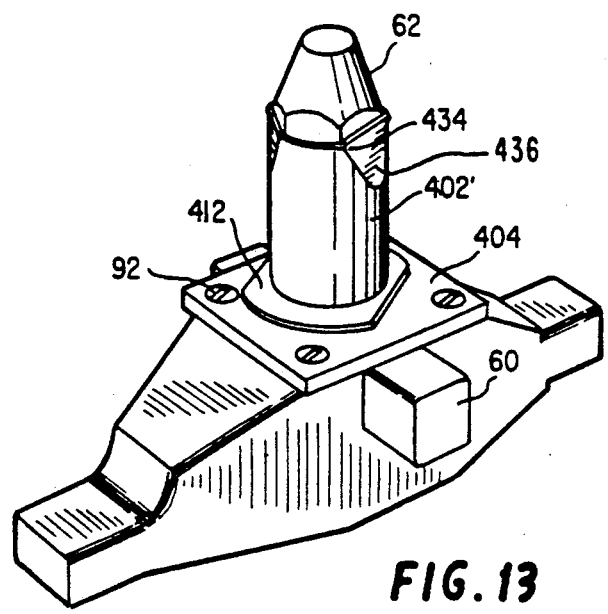
FIG. 13 is a perspective view of the jet pump hold down beam depicted in FIG. 12 illustrating details of the beam bolt keeper following keeper crimping.

With reference to FIGS. 11-13, there is depicted a new bolt keeper 400 for rotatably fixing the position of a bolt such as a beam bolt 62 extending therethrough. The keeper 400 comprises an open-ended keeper sleeve 402 and a keeper plate 404 configured to receive and retain the sleeve 402. Preferably, both the keeper sleeve 402 and plate 404 are formed from either an Inconel 600 or Inconel 690 alloy when the keeper 400 is to be used in conjunction with rotatably fixing the position of a beam bolt within the channel 64 of the hold down beam. However, it will be appreciated from the following description that the bolt keeper 400 can be used to fix the rotatable position of a variety of members which are rotatably received within a threaded channel formed in a support surface. In the preferred embodiment, a lower end 406 of the sleeve 402 is externally threaded for receipt within a mutually engageable, correspondingly-threaded plate aperture 408. When the keeper 400 is to be used in conjunction with a hold down beam, the keeper plate 404 carries a plurality of fastener apertures 410 correspondingly-positioned to the fastener apertures of keeper plate 90 of the original hold down beam 52. Prior to installation of the new keeper 400, the original keeper plate 90 is removed from a replacement hold down beam 52', and the new keeper plate 404 is installed in place of the original keeper plate 90 by threaded fasteners 92. However, other securing means, such as welding, can be used for securing the new keeper plate 404 to the replacement beam 52'. The keeper sleeve 402 is deformable against at least one of the facets 78 of the bolt head 66 to rotatably secure the position of the bolt 62 within the beam 52'. In a preferred aspect of the invention, the keeper sleeve 402 and plate aperture 408 are threaded in a direction opposite the threading of the beam bolt 62 so that rotational movement of the bolt 62 within the beam 52' in a direction that would tend to detention the beam causes further tightening of the sleeve 402 within the keeper plate aperture 408, thereby providing additional resistance to further beam bolt rotation.

In a further preferred aspect of the invention, the keeper sleeve 402 is provided with a flange 412 which extends outwardly from the sleeve and is positioned so as to be closely adjacent to the upper surface 404a of the keeper plate 404 upon threaded engagement of the sleeve 402 with the keeper aperture 408. The flange 412 preferably includes a pair of opposed, flattened edges 414. The flattened edges 414 of the flange facilitate flange grasping incident to sleeve removal from the keeper plate.

With reference to FIG. 12, there is depicted a keeper crimping device 420 for deforming the cylindrical keeper sleeve 402 against the facets 78 of the beam bolt 62. The crimping device 420 includes a crimper head 422 having a cavity 424 insertable over the end of the beam bolt 62 and surrounding keeper sleeve 402. The cavity 424 is defined by a wall 426 having a generally truncated triangular cross-sectional configuration to provide three generally planar sidewalls 428. Adjacent sidewalls 428 are connected by a semi-circular recess 430. Each of the sidewalls 428 is provided with a keeper working surface 432 which is tapered inwardly from the open end of the crimper head 422 so as to engage and deform the keeper sleeve 402 upon insertion thereover. As the sleeve 402 is flattened by the crimper working surface 432, a sleeve crimp 434 (FIG. 13) is formed in each crimper recess 430 between adjacent sidewalls. In a preferred aspect of the invention, the keeper sleeve 402 is deformable against at least one, and preferably three, of the facets 78 of the beam bolt so as to frictionally couple the keeper sleeve to the bolt head. A crimped keeper 402' resulting from crimping engagement of a keeper sleeve 402 with the crimping device 420 is depicted in FIG. 13 as having a plurality of crimped sidewall surfaces 436 resulting from engagement with the work surface 430 of frictionally engage the facets 78 of the beam bolt 62 to inhibit rotation of the bolt within the sleeve.

A collar 438 extending from an upper end 422a of the crimper head 422 is provided with means, such as key slot 440, for coupling the crimper 420 with the lower end of pole 48 (FIG. 1) correspondingly configured to receive a key inserted through slot 440 to permit manipulation of the crimper from a position such as the refueling bridge 24 remote from the reactor vessel flange and jet pump hold down beam.

Jet Pump Replacement Hold Down Beam Installation

The beam tensioning tool 150 (FIGS. 3-6) can be used to install a replacement hold down beam 52' between the opposed riser brackets 54 of the jet pump assembly from a position such as the refueling bridge 24 remote from the reactor vessel flange 14 and the jet pump assembly, even when the refueling cavity 18 is filled with moderator fluid incident to reactor fuel changeovers. Replacement beam installation is accomplished by first removing the original weld plate 90 supplied with the beam and replacing it with the keeper plate 404 of the present invention. The keeper sleeve 402 is inserted over the beam bolt 62 and rotatably inserted into the keeper aperture 408 to secure the sleeve to the keeper plate. The replacement beam is positioned adjacent the lower end 190 of the tool housing 180 such that the beam tabs 58 oppose the push rod contact heads 172 of the hydraulic rams 154. The trunnion engaging apparatus 194 is actuated by supplying fluid to cylinder 200 so as to extend the piston 204 outwardly from the cylinder body 200 and move the hooks 196 into engagement with the pair of opposed beam trunnions 60. With the replacement beam 52' thus positioned, the tensioning tool 150 is lowered into the reactor annulus 28 and manipulated into position adjacent to inlet mixer 38 of the jet pump so that the beam tabs 58 extend into the notches 106 formed in the opposed riser brackets 54. The socket head 220 is lowered over the beam bolt 62 and rotated in the appropriate direction to lower the bolt flange 72 into abutment with the inlet mixer channel 94. Ram cylinders 154 are activated to extend push rods 168 from their respective cylinder bodies 162 to depress the ends of the beam tabs 58. The beam bolt 62 is further rotated to elevate the beam tabs 58 into engagement with the riser bracket shoulders 108 so that a tension between the beam tabs 58 and the riser bracket of on the order of about 9,100 kg (20,000 lbs.) per beam tab results upon deactivation of ram cylinders 154. Once the desired beam tension has been obtained, ram cylinders 154 are actuated so as to retract the push rods 168 from the beam tabs, and the hook displacement cylinder 200 is actuated so as to retract the piston 204 and move the trunnion-engaging hooks 196 to their retracted positions. Thereafter, the beam tensioning tool 150 is removed from the reactor annulus 28. The keeper 400 is crimped against the beam bolt 62 by lowering the keeper crimping device 420 over the cylindrical keeper sleeve 402 and applying an impacting force from the remote position above the reactor flange that is transmitted to the crimping device 420. Application of the impacting force directs the crimper head 422 over the sleeve 402 to effect sleeve deformation over the beam bolt facets 78.

Although the present invention has been described with reference to various preferred embodiments, the invention is not limited to the detail set forth above. Other substitutions and modifications which may occur to those of ordinary skill in the art are intended to follow within the scope and spirit of the invention as set forth in the appended claims.

What is claimed is:

1. A process for remotely removing a jet pump hold down beam mounted between opposed members in a nuclear reactor, the hold down beam having a beam body, a pair of opposed beam tabs extending outwardly from the beam body, a pair of positioning trunnions, and a threaded beam bolt received within a correspondingly-threaded channel extending through the beam body, a lower end of the beam bolt extending through an aperture formed in a beam bolt retainer plate, the retainer plate being coupled by a connecting member to the jet pump, the beam bolt being rotatably adjusted within the beam channel so as to urge the beam tabs against the opposed reactor members, the process comprising the steps of:

grasping the beam trunnions;
depressing the beam tabs;
rotating the beam approximately 90° about the beam bolt so as to remove the beam tabs from the opposed reactor members;
removing the retainer plate connecting member in its entirety from the jet pump; and
removing the entire hold down beam, retainer plate, and retainer plate connecting member from the jet pump.

2. A process according to claim 1, the nuclear reactor comprising a reactor vessel mounted adjacent a floor of a cavity selectively floodable with moderator fluid, wherein the process is conducted following cavity flooding and while the reactor vessel is immersed in moderator fluid.

3. A process according to claim 2, in which at least one of the steps is controlled from a position remote from the reactor vessel and above the surface of the fluid in the cavity.

4. A process according to either of claims 1, 2 or 3, in which the lower end of the beam bolt includes a flange dimensioned to engage the retainer plate adjacent the retainer plate aperture, said retainer plate being positioned between said bolt flange and the beam body, further comprising the step of rotating the beam bolt and advancing the retainer plate toward a lower end of the beam body prior to removal of the hold down beam.

5. A process according to claim 4, in which the beam bolt is received within a keeper coupled to the beam body by fastening means to rotatably fix the position of the beam bolt within the beam channel, the process further comprising the step of unfastening said keeper fastening means prior to advancing the retainer plate toward the beam body.

6. A process according to claim 5, wherein the keeper fastening means comprises a tack weld and the step of unfastening the keeper fastening means comprises applying rotational torque to the beam bolt in an amount sufficient to break said tack weld.

7. A process for remotely removing a jet pump hold down beam mounted between opposed members in a nuclear reactor, the hold down beam having a beam body, a pair of opposed beam tabs extending outwardly from the beam body, a pair of positioning trunnions and a threaded beam tensioning bolt received within a correspondingly-threaded channel extending through the beam body, the beam bolt being rotatably arranged within the beam so as to urge the beam tabs against the opposed reactor members, the process comprising the steps of:

a. remotely positioning a jet pump beam servicing tool over the beam, the tool comprising:
a tool housing having a lower surface configured to be positionable over the body of the hold down beam, said tool housing defining a cavity for receiving the beam bolt upon positioning of the housing lower surface over the body of the beam, the housing comprising a pair of fluid-actuated rams, each of said rams comprising a cylinder body and a push rod reciprocably extensible from said cylinder body for depressing the beam tabs;
means coupled to said housing for engaging the beam trunnions to draw the body of the beam into abutment with the lower surface of the housing;

means coupled to said trunnion engaging means for selectively urging said trunnion engaging means between a trunnion engaging position and a retracted position; and means coupled to said fluid-actuated rams for selectively urging the push rods between a beam tab engaged position and a disengaged position;

b. directing the trunnion engaging members into engagement with the beam trunnions;

c. extending the ram push rods to depress the beam tabs of the hold down beam;

d. rotating the beam body to direct the beam tabs from the opposed members; and e. removing the tool and engaged hold down beam from the jet pump.

8. A process according to claim 7, in which the beam bolt is received within a keeper coupled to the beam body by fastening means to rotatably fix the position of the beam bolt within the beam, the process further comprising the step of unfastening said keeper fastening means.

9. A process according to claim 8, the beam bolt being retained in position adjacent the jet pump by a retainer plate coupled by a retainer bolt to the jet pump, the process further comprising the steps of removing the retainer bolt in its entirety from the jet pump and removing the retainer bolt and retainer plate with the hold down beam from the nuclear reactor.

10. A process according to either of claims 7, 8 or 9, the nuclear reactor comprising a reactor vessel mounted adjacent a floor of a cavity selectively floodable with moderator fluid, wherein the beam removal process is conducted following cavity flooding and while the reactor vessel is immersed in moderator fluid.

11. A process for remotely installing a replacement jet pump hold down beam between opposed members of a nuclear reactor to secure a fluid-circulating jet pump in a predetermined position, the hold down beam having a beam body, a pair of opposed beam tabs extending outwardly from the beam body, a pair of opposed beam positioning trunnions, and a threaded beam bolt received within a correspondingly-threaded channel formed in the beam body, the process comprising the steps of:

positioning a keeper over the beam bolt of the replacement hold down beam and coupling the keeper to the body of the beam;

lowering the hold down beam into the reactor adjacent the jet pump and remotely positioning the beam tabs between the opposed reactor members;

rotating the beam bolt so as to tension the beam between the opposed reactor members; and deforming said keeper against the beam bolt to rotatably fix the position of the beam bolt within the beam channel.

12. A process according to claim 11, further comprising the step of depressing the beam tabs as the beam bolt is rotated to tension the beam tabs between the opposed reactor members.

13. A process according to claim 11, wherein said keeper comprises a keeper sleeve rotatably received within a threaded aperture formed in a keeper plate, wherein the keeper plate is fastened to the beam body and the keeper sleeve is crimped to rotatably fix the position of the beam bolt within the beam channel.

14. A process according to claim 11, in which the nuclear reactor includes a reactor vessel mounted adjacent a floor of a cavity selectively floodable with moderator fluid, wherein the beam installation process is conducted following cavity flooding and while the reactor vessel is immersed in moderator fluid, the process being controlled from a position remote from the reactor vessel above the surface of the fluid in the cavity.

15. A process according to either of claims 11, 12, 13 or 14, Wherein installation of the replacement beam is accomplished through the use of a tool comprising:

a tool housing having a lower surface configured to be positionable over the body of the hold down beam, said tool housing comprising a pair of fluid-actuated rams, each of said rams comprising a cylinder body and a push rod reciprocably extensible from said cylinder body for depressing the beam tabs;

fluid-actuated cylinder means for engaging the beam trunnions to draw the body of the hold down beam into abutment with the lower surface of the housing;

means coupled to said rams and said trunnion engaging cylinder means for selectively actuating said rams and said trunnion engaging means from a position remote from the nuclear reactor; and means connectable to said housing for changing the directional orientation of the beam and for rotatably engaging the beam bolt.

16. A method for removing a jet pump hold down beam positioned between opposed members in a nuclear reactor from a position remote from the nuclear reactor, the hold down beam having a beam body, a pair of opposed beam tabs extending outwardly from the beam body, a pair of positioning trunions, and a threaded beam bolt extending through a correspondingly-threaded channel formed in the beam body, a lower end of the beam bolt extending through an aperture formed in a beam bolt retainer plate and having a flange which extends laterally beyond the retainer plate aperture, the retainer plate being positioned between the beam and the beam bolt flange and being coupled to the jet pump by a threaded retainer bolt, the method comprising the steps of:

rotating the beam tabs approximately 90° from the opposed reactor members;

rotatably removing the retainer bolt in its entirety from the jet pump;

rotating the beam bolt in a predetermined rotational direction to advance the retainer plate toward the hold down beam; and removing the hold down beam, retainer plate, and retainer bolt from the nuclear reactor.

17. A method according to claim 16, wherein all of the hold down beam removal steps are controlled from a position remote from the nuclear reactor.

18. A method according to claim 16, in which the nuclear reactor comprises a reactor vessel mounted in a floor of a selectively floodable cavity, further comprising the step of flooding the cavity to immerse the reactor vessel in moderator fluid, wherein all of the hold down beam removal steps are controlled from a position remote from the reactor vessel and above the surface of fluid in the flooded cavity.

* * * * *